G. P. TREULIEB,
Assignor of one-half to J. H. STROMBERG.
MEAT CUTTER.
No. 9,954. Reissued Nov. 29, 1881.
FIG. I.
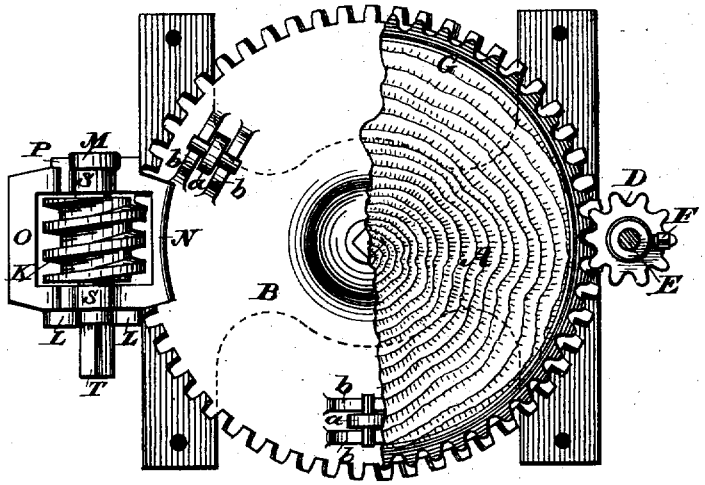
FIG. II.
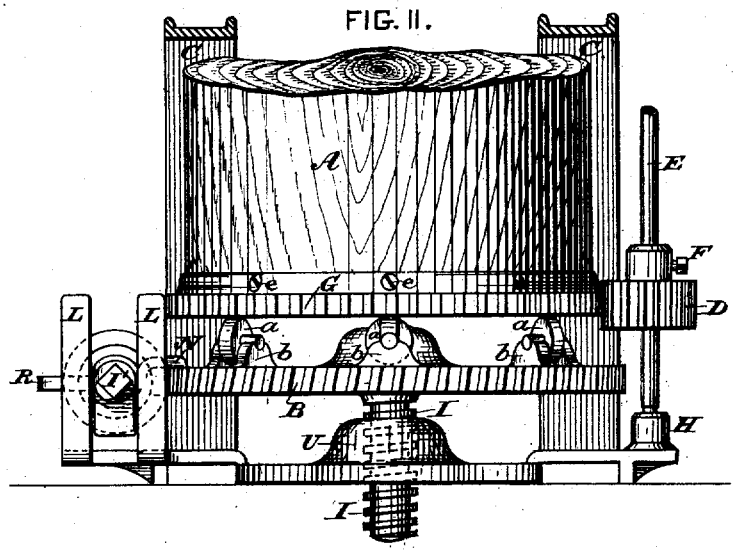
FIG. III.
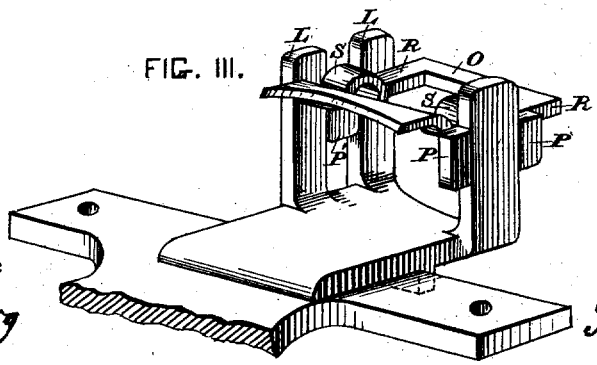
WITNESSES:
J. H. Stromberg
A. H. Ritz.
INVENTOR:
Geo. P. Treulieb.
N. PETERS, Photo-Lithographer, Washington, D. C.

UNITED STATES PATENT OFFICE.

GEORGE P. TREULIEB, OF BALTIMORE, MARYLAND, ASSIGNOR OF ONE-HALF TO JOHN H. STROMBERG, OF SAME PLACE.

MEAT-CUTTER.

SPECIFICATION forming part of Reissued Letters Patent No. 9,954, dated November 29, 1881.

Original No. 98,318, dated December 28, 1869. Application for reissue filed October 21, 1881.

*To all whom it may concern:*

Be it known that I GEORGE P. TREULIEB, of Baltimore city, in the county of Baltimore and State of Maryland, have invented certain new and useful Improvements in Meat-Cutters; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to improvements in meat-cutters, and the object is to more readily adjust the chopping-block toward the knives as it wears away in the operation.

The invention consists in an adjusting-screw working in a female screw or nut and operated by suitable gearing; also, in the construction and arrangement of certain parts, as will be more fully described hereinafter, reference being had to the accompanying drawings, in which—

Figure I is a plan or top view of the apparatus, one-half of the block removed in order to show its supports. Fig. II is an elevation thereof. Fig. III is a perspective view of the sliding frame supporting the worm, hereinafter described.

Like letters of reference indicate similar parts in the different figures.

A represents the block, resting on rollers *a a a*, which, running in bearings *b b b*, rigidly attached to the horizontal worm-wheel B, allow the block A to revolve freely during the cutting operation.

C C are upright posts between which the block moves, and by which it is held in position.

D is a pinion adapted to slide up and down on the vertical driving-shaft E, and held by a set-screw, F, in any position to which it may be adjusted. Its teeth mesh into the horizontal gear-wheel or rim G, which is attached to the block A by screws *c c* or other means, for the purpose of communicating rotary motion thereto. The shaft E turns in a step, H. The elevating-screw I is rigidly attached to the horizontal worm-wheel B and moves in a female screw or nut, U, which is formed in the bed-plate of the machine.

K represents the endless screw or worm which gears with the horizontal wheel B.

L L M, Fig. III, are guides on which the frame of the worm K slides respectively up and down. They may be extended to any desired length to accommodate the position of the worm to the respective position of the worm-wheel B.

N O, Fig. III, are side bars of the frame, the former of which, being bent upward and extending inward of the machine, as shown in Fig. II, rests on the surface of the wheel B, thus supporting the worm in proper position.

P P are slides moving on the outer sides of the guide M, while the slide P′ moves between the two guides L L.

R R are the cross-bars of the frame, forming in their extension between the side bars, N and O, the bearings S S for the axis T, Fig. I, of the worm.

In order to raise the block A, motion is given to the worm K by means of a crank or key applied to its axis T. The worm K, griping into the teeth of the gear-wheel B, turns the latter, and thus causes the screw I, rigidly attached to it, to rise and lift it, and with it the block A. The pinion D is then brought into suitable position, and, after being rigidly attached to the vertical shaft E by means of set-screw F, motion is given to the shaft E, by which the block is turned. While thus raising the apparatus the side bar, N, of the frame, resting on the surface of the gear-wheel B, follows the upward movement of the latter, and being rigidly attached to the cross-bars R R, forming the bearings of the axis T of the worm, causes the latter to rise in the same proportion, being held in its horizontal position by means of the guides L L and slide P′ at one side, and by means of the guide M and slides P P at the other side.

The guides L L M may be made of any desired or suitable length, so as to allow the worm to follow the upward movement of the apparatus to any desired extent.

Having thus described my invention, what I claim, and desire to secure by Letters Patent, is—

1. In a meat-cutter, the combination, with the chopping-block, of an adjusting-screw, I, fitting into a nut or screw-threaded plate, U, provided with a worm-wheel rigidly attached thereto, arranged substantially as specified.

2. In a meat-cutter, the adjusting-screw I, fitting into a nut or screw-threaded plate, U, provided with a worm-wheel, B, rigidly attached thereto, and operated by a worm, K, arranged substantially as specified.

3. In a meat-cutter, an adjusting-screw, I, fitting into a screw-threaded plate, U, having a worm-wheel, B, rigidly attached thereto, and provided with rollers *a a*, for supporting the block A, and operated by a worm, K, arranged substantially as specified.

4. In a meat-cutter, the combination of an adjusting-screw, I, fitting into a centrally screw-threaded plate, U, having rigidly attached thereto a worm-wheel, B, with the worm K, pinion D, shaft E, and a guiding-frame, all substantially as set forth.

5. In a meat-cutter, the combination of the adjusting-screw and nut or screw-threaded plate U, having rigidly attached thereto the worm-wheel B, into which the worm K meshes, with the rollers *a a a*, gear-wheel G, forming the bed for the block A, pinion D, and shaft E, all arranged substantially as specified.

6. In combination with the worm K, worm-wheel B, the frame N O R R, bearings S S, guides L L M, and slides P P P′, all constructed and arranged substantially as described.

7. The combination and arrangement of the block A, rollers *a a a*, worm-wheel B, worm K, its frame N O R S S, guides L L M, slides P P P′, screw I, and female screw U, substantially as and for the purpose set forth.

In testimony that I claim the foregoing I have hereunto set my hand this 15th day of June, 1881.

GEORGE P. TREULIEB.

Witnesses:
I. H. STROMBERG,
ALEX. H. BETZ.